(12) United States Patent
Dudar et al.

(10) Patent No.: US 11,614,063 B2
(45) Date of Patent: *Mar. 28, 2023

(54) MULTI-DRONE GROUND VEHICLE JUMP START

(71) Applicant: Ford Global Technologies, LLC, Dearborn, MI (US)

(72) Inventors: Aed M. Dudar, Canton, MI (US); Douglas Raymond Martin, Canton, MI (US); Kenneth James Miller, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 615 days.

This patent is subject to a terminal disclaimer.

(21) Appl. No.: 16/603,310

(22) PCT Filed: Apr. 12, 2017

(86) PCT No.: PCT/US2017/027173
§ 371 (c)(1),
(2) Date: Oct. 7, 2019

(87) PCT Pub. No.: WO2018/190823
PCT Pub. Date: Oct. 18, 2018

(65) Prior Publication Data
US 2021/0017945 A1    Jan. 21, 2021

(51) Int. Cl.
*F02N 11/12*    (2006.01)
*B64C 39/02*    (2023.01)
(Continued)

(52) U.S. Cl.
CPC ............ *F02N 11/12* (2013.01); *B64C 39/024* (2013.01); *B64U 10/13* (2023.01); *B64U 2101/00* (2023.01); *F02N 2300/306* (2013.01)

(58) Field of Classification Search
CPC . B64C 39/02; B64C 39/024; B64C 2201/126; B64C 2201/027; F02N 11/12; F02N 2300/306; H02J 1/122
(Continued)

(56) References Cited

U.S. PATENT DOCUMENTS 6,344,733 B1    2/2002  Crass et al.
8,983,682 B1    3/2015  Peeters et al.
(Continued)

FOREIGN PATENT DOCUMENTS

CN    204095590 U      1/2015
CN    205891228 U  *  1/2017
(Continued)

OTHER PUBLICATIONS

Notification of Transmittal of International Search Report and Written Opinion of International Searching Authority regarding International Application No. PCT/US2017/027173 dated Jun. 27, 2017 (25 pages).

*Primary Examiner* — David V Henze-Gongola
*Assistant Examiner* — Dung V Bui
(74) *Attorney, Agent, or Firm* — Brandon Hicks; Bejin Bieneman PLC

(57) ABSTRACT

Disclosed herein is a system including a computer programmed to actuate a plurality of drones to first establish one or more electrical connections therebetween and then to provide a jump start to a vehicle.

20 Claims, 7 Drawing Sheets

(51) Int. Cl.
  *B64U 10/13* (2023.01)
  *B64U 101/00* (2023.01)

(58) Field of Classification Search
  USPC .............. 320/105; 439/504, 624; 307/10.1;
                                                  191/12.4
  See application file for complete search history.

(56) References Cited

U.S. PATENT DOCUMENTS

| | | |
|---|---|---|
| 9,056,676 B1 | 6/2015 | Wang |
| 9,579,990 B2 * | 2/2017 | Butler .................. H02J 7/0047 |
| 11,271,420 B2 * | 3/2022 | Dudar ...................... H02J 7/14 |
| 2007/0190369 A1 * | 8/2007 | Leach .................. H02J 7/0019 |
| | | 429/61 |
| 2012/0005031 A1 | 1/2012 | Jammer |
| 2014/0217230 A1 | 8/2014 | Helou, Jr. |
| 2016/0378108 A1 * | 12/2016 | Paczan ................. G06Q 10/083 |
| | | 705/330 |
| 2019/0172278 A1 * | 6/2019 | Castro Duran ........ G06Q 10/20 |

FOREIGN PATENT DOCUMENTS

| | | | |
|---|---|---|---|
| CN | 205186532 U | 4/2019 | |
| DE | 102014213023 A1 * | 1/2016 | .......... B60L 11/1824 |
| DE | 102014213023 A1 | 1/2016 | |
| DE | 102015008768 A1 | 1/2017 | |
| FR | 3040688 A1 * | 3/2017 | |
| JP | 2016165215 A * | 9/2016 | ............. B64C 27/08 |

* cited by examiner

MULTI-DRONE GROUND VEHICLE JUMP START

BACKGROUND

Vehicles relying on an internal combustion engine may require an alternate source of electricity when an onboard electric power source, such as a battery, is inadequate to actuate a starter motor of the vehicle. For example, electricity may be provided via a "jump start," e.g. a user connecting the onboard electrical source to an alternate electrical power source, such as a battery of another vehicle. However, in many situations, jump starts are currently unavailable.

DETAILED DESCRIPTION

Introduction

Figure 1:
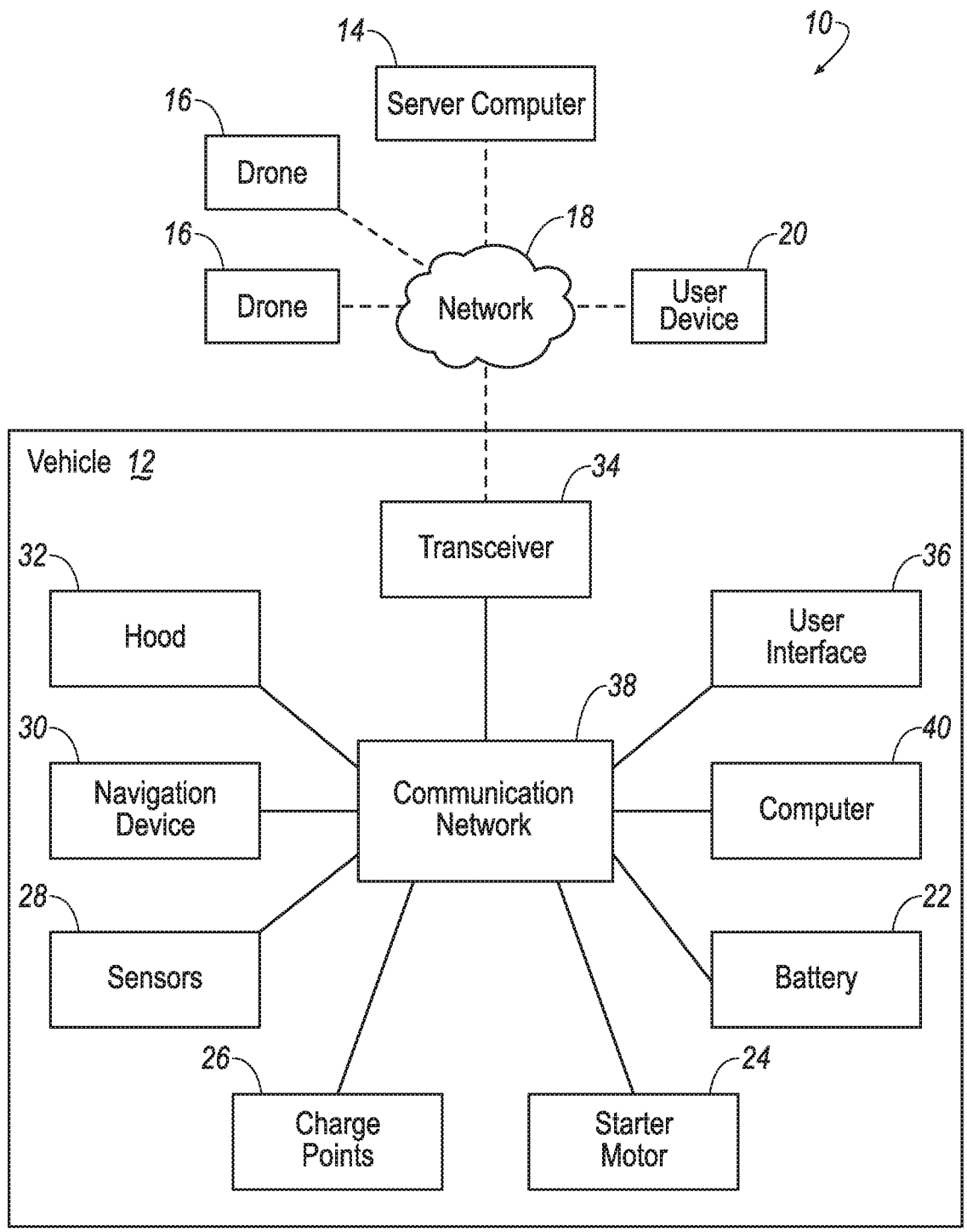
FIG. 1 is a block diagram of components of an example vehicle and jump start system.

Disclosed herein is a method comprising actuating a plurality of drones to first establish one or more electrical connections therebetween and then to provide a jump start to a vehicle.

The method may further comprise assigning a master drone and a slave drone from among the plurality of drones.

The method may further comprise transmitting an instruction specifying an order of connection of the drones from the master drone to the slave drone.

The method may further comprise receiving a jump start request including jump start parameters before actuating the plurality of drones. The jump start parameters may include one of a voltage and an amperage.

The method may further comprise actuating a robotic arm supported by a first drone of the plurality of drones to connect the first drone with a second drone of the plurality of drones.

The method may further comprise determining a location in three-dimensional space one of an electrically conductive end effectors supported by the second drone based on a pair of images captured by a pair of cameras supported by the robotic arm of the first drone, wherein the robotic arm of the first drone is actuated to connect to the second drone based on the location in three-dimensional space.

The method may further comprise transmitting an instruction specifying a connection order of the plurality of drones. The connection order may be one of in series and in parallel.

Also disclosed herein is a computer having a processor and memory programmed to perform some or all of the disclosed method. Also disclosed is a computer-readable medium storing computer-executable instructions to perform some or all of the disclosed method.

Also disclosed herein is a system comprising a computer programmed to actuate a plurality of drones to first establish one or more electrical connections therebetween and then to provide a jump start to a vehicle.

The computer may be further programmed to assign a master drone and a slave drone from among the plurality of drones.

The computer may be further programmed to actuate the plurality of drones in response to receiving a jump start request including jump start parameters. The jump start parameters may include one of a voltage and an amperage.

Also disclosed herein is a system comprising a first drone computer programmed to establish an electrical connection between a first drone and a second drone, and then provide a jump start to a vehicle.

The first drone computer may be further programmed to transmit an instruction specifying a connection order to the second drone. The connection order may be one of in series and in parallel.

The first drone computer may be further programmed to actuate a robotic arm supported by the first drone to establish the electrical connection between the first drone and the second drone.

The first drone computer may be further programmed to determine a location in three-dimensional space of an electrically conductive end effector supported by the second drone based on a pair of images captured by a pair of cameras supported by the robotic arm of the first drone, wherein actuating the robotic arm to establish the electrical connection between the first drone and the second drone is based on the location in three-dimensional space.

The system may further comprise a first drone including a telescoping robotic arm supporting an electrically conductive end effector electrically connected to a first drone power source.

The system may further comprise a first drone including a robotic arm supporting a camera and an electrically conductive end effector electrically connected to a first drone power source.

The system may further comprise a first drone including a robotic arm supporting an end effector comprising one of a male and female electrical connector that is conical.

The system may further comprise a server computer programmed to communicate with the first drone computer to actuate the first drone to establish the electrical connection.

With reference to FIGS. 1-5, wherein like numerals indicate like parts throughout the several views, a vehicle jump start system 10 provides an electric power source to a vehicle 12 with a dead battery, even if none is available at a location of the vehicle 12. Accordingly, the vehicle jump start system 10 includes a server computer 14 programmed to actuate a plurality of aerial drones 16 to first establish one or more electrical connections therebetween, and then to provide a jump start to the vehicle 12.

The Wide Area Network

A network 18 (sometimes referred to as a wide area network because it can include communications between devices that are geographically remote from one another, i.e., not in a same building, vehicle, etc.,) represents one or more mechanisms by which the server computer 14 may communicate with remote devices, e.g., the vehicle 12, the aerial drones 16, a user device 20, etc. Accordingly, the network 18 may be one or more wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The Vehicle

With reference to FIG. 1, the vehicle 12 may include any passenger or commercial automobile such as a car, a truck, a sport utility vehicle, a crossover vehicle, a van, a minivan, a taxi, a bus, etc. In some possible approaches, the vehicle 12 is an autonomous vehicle that can operate in an autonomous (e.g., driverless) mode, a partially autonomous mode, and/or a non-autonomous mode. The vehicle 12 may include a vehicle battery 22, a starter motor 24, a plurality of electrically conductive jump start charge points 26, vehicle sensors 28, a vehicle navigation device 30, a hood 32, a vehicle transceiver 34, a vehicle user interface 36, a vehicle communication network 38, and a vehicle computer 40.

The vehicle battery 22 provides electricity to the vehicle computer 40 and the starter motor 24. The vehicle battery 22 may include, for example, one or more of a lithium-ion battery, a nickel-metal hydride battery, a lead-acid battery, or other device(s) capable of receiving, storing, and proving electrical energy.

The starter motor 24 provides torque to rotate a crankshaft of the engine of the vehicle 12. For example, the starter motor 24 may be an electric motor connected to the crankshaft via one or more gears, chains and sprockets, belts and pulley wheels, shafts, etc. The starter motor 24 may actuate to rotate the crankshaft, e.g., in response to a command from the vehicle computer 40. For example, the starter motor 24 may include a starter solenoid that is actuated by the vehicle computer 40 to provide electricity from the vehicle battery 22 to the starter motor 24.

The plurality of electrically conductive jump start charge points 26 enable a load voltage from a remote power supply, such as a drone power source 42, to be applied to the vehicle 12, such as to the vehicle battery 22. One of the charge points 26 is in electrical communication with a positive terminal of the vehicle battery 22. Another of the charge points 26 is in electrical communication with a negative terminal of the vehicle battery 22 and/or a ground of the vehicle 12. Exemplary charge points include positive and negative battery terminals, electrically conductive posts wired to the battery terminals, grounded vehicle components, such as a frame of the vehicle 12, etc.

The vehicle sensors 28 may detect internal states of the vehicle 12, for example, wheel speed, vehicle battery 22 charge and/or voltage level, wheel orientation, tire pressure, and engine and transmission variables. The vehicle sensors 28 may detect the position or orientation of the vehicle 12, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The vehicle sensors 28 may detect the external world, for example, light measurement sensors, photometers, wind speed measurement sensors, radar sensors, scanning laser range finders, light detection and ranging (LIDAR) devices, and image processing sensors such as cameras.

The vehicle navigation device 30 determines a location of the vehicle 12 relative to stored map data. Map data may include roads and related data, such as a number of lanes and availability of a shoulder, parking lot, and public rest area locations, etc. To determine the location, the vehicle navigation device 30 may rely on information from a global navigation satellite system, distance data from vehicle sensors 28 attached to a drivetrain of the vehicle 12, a gyroscope, and/or an accelerometer. The map data may be stored locally, such as in the vehicle 12 computer 40 memory (discussed below), in the vehicle navigation device 30, etc. and/or remotely, such as in the server computer 14. Additionally or alternatively, the map data may be stored on a remote computer or network, accessible via the vehicle 12 communication network 18. Exemplary vehicle navigation devices 30 include known GPS (global positioning system) navigation devices, personal navigation devices, and automotive navigation systems.

The hood 32 provides an ornamental and protective cover to the engine and other vehicle components housed with an engine bay of the vehicle 12. The hood 32 is movable between an open and a closed position. The hood 32 may include electromechanical components, such as a linear actuator, hydraulic piston, rack and pinion, etc., configured to actuate, e.g., in response to a command from the vehicle computer 40, to move the hood 32 between the open and closed position.

The vehicle transceiver 34 is implemented as described below for a drone transceiver 46. The transceiver 34 may communicate with other vehicles and computing devices, e.g., the aerial drone 16 and the server computer 14, etc. The transceiver 34 may communicate directly, i.e., with a communication that is transmitted or received without an intervening device, e.g., a repeater other network component. The transceiver 34 may alternatively or additionally communicate indirectly, i.e., with a communication that is transmitted or received via an intervening device, e.g., components of the network 18. The transceiver 34 may communicate with other devices as described herein, including components of the network 18, via a variety of media and/or protocols, e.g., RF communications, dedicated short range communication (DSRC), BLUETOOTH, an Ethernet connection or other wired connection, IEEE 802.11, etc.

The vehicle user interface 36 presents information to and receives information from an occupant of the vehicle 12. The user interface 36 may be located, e.g., on an instrument panel in a passenger cabin of the vehicle, or wherever may be readily seen by the occupant. The user interface 36 may include dials, digital readouts, screens such as a touch-sensitive display screen, speakers, and so on for providing information to the occupant, e.g., human-machine interface (HMI) elements. The user interface 36 may include buttons, knobs, keypads, microphone, and so on for receiving information from the occupant.

The vehicle communication network 38 includes hardware, such as a communication bus, an antenna, circuits, chips, etc., for facilitating wired or wireless communication among the vehicle components in accordance with a number of communication protocols such as the Dedicated Short Range Communication (DSRC) communication protocol, controller area network (CAN), Ethernet, WiFi, Local Interconnect Network (LIN), and/or other wired or wireless mechanisms.

The vehicle computer 40 is a computing device that includes a vehicle processor and a vehicle memory.

The vehicle processor is implemented as described below for a drone processor. The vehicle processor is programmed to process the data received via the vehicle 12 communication network 18, the vehicle memory, the vehicle navigation device 30, etc. Processing the data and communications may include processing to perform the processes described herein, such as those described in process 600.

The vehicle memory is implemented as described below for a drone memory. The vehicle memory may store instructions for performing the processes described herein, such as the process 600, and data collected from sensors and communications. The vehicle memory may store data including charge point 26 specifications and jump start parameters.

A charge point 26 specification states a location of one or more charge points 26 for connecting to the vehicle 12 to provide power to the vehicle battery 22. A charge point 26 location may be specified according to a three-dimensional Cartesian coordinate system with an origin somewhere in or on the vehicle 12. Further, a memory of the computer 40 can store an image (sometimes referred to as a base image) of the vehicle 12 or at least a portion thereof including one or more charge points 26, along with data specifying a location in the image of each of the charge points, e.g., according to two-dimensional pixel coordinates, and with data mapping the two-dimensional pixel coordinates to three-dimensional vehicle coordinates. The computer 40 can provide this data to a drone 16 computer; alternatively or additionally, the data could be stored in a memory of the drone 16 computer. The drone 16 computer can then receive still and/or video image data captured by a drone imaging device 16. By comparing the captured real-time or near real-time image data with the stored base image, and using the provided vehicle 12 coordinate system and the mapping of the base image data to the three-dimensional coordinate system, the drone 16 can identify the charge points 26.

The jump start parameters indicate electrical parameters required for jump starting the vehicle 12. The jump start parameters may include a voltage, e.g., 12 volts, 24 volts, etc., and/or amperage, e.g., 50 amps. The jump start parameters may further include landing location(s) on the vehicle 12, e.g., on an engine component cover, portion of the frame or body, etc., and/or hovering location(s) near the vehicle 12 for the drone(s) 16 to occupy while providing the jump start, e.g., a landing or hovering location may be specified as relative to one or more charge points 26 according to a vehicle 12 coordinate system. The base image described above may be compared with image data captured by the drone 16, as described above, to enable the drone 16 to land on the landing location.

The vehicle computer 40 is in electronic communication, e.g., via the vehicle communication network 38, with one or more input devices for providing data to the vehicle computer 40, and one or more output devices for receiving data and/or instructions from the vehicle computer 40, e.g., to actuate the output device. Exemplary input devices include: human machine interfaces (HMIs) such as a switch or graphical user interface (GUI); imaging devices such as LiDAR, still and/or video cameras, infrared sensors, the vehicle sensors 28, the vehicle navigation device 30, the vehicle transceiver 34, etc., as well as other sensors and/or electronic control units (ECUs) that are known to provide data, e.g., on the vehicle communication network 38, such as, radar, ultrasonic sensors, accelerometers, gyroscopes, pressure sensors, thermometers, barometers, altimeters, current sensing devices, voltage sensing devices, microphones, light sensors, etc. etc. Exemplary output devices that may be actuated by the vehicle computer 40 include: HMIs, the vehicle navigation device 30, the vehicle transceiver 34, the vehicle battery 22, the hood 32, the starter motor 24, etc.

The vehicle computer 40 may be programmed to transmit a jump start request. As used herein, "jump start request" means a communication, e.g., from the vehicle 12 and/or the user device 20 to the server computer 14, and/or the drones 16, requesting jump start service. The jump start request may include a location, e.g., GPS coordinates, and orientation, e.g., compass heading indicating a forward-facing direction, of the vehicle 12, charge point 26 specifications, jump start parameters of the vehicle 12, and vehicle 12 identification information, e.g., a serial number, unique name, etc., associated with the vehicle 12. Alternatively or additionally, some of the foregoing information, e.g., charge 26 specifications and jump start parameters, could be provided by the vehicle 12 computer 40 to the drone 16 upon arrival of the drone 16 to provide the jumpstart.

The jump start request may be transmitted in response to an input to the user interface 36 of the vehicle 12, and/or in response to the vehicle computer 40 determining that the engine is of the vehicle 12 is not running, e.g., a rotational rate of the engine is zero, and a voltage of the vehicle battery 22 is below a threshold amount, e.g. 7 volts, e.g., based on information received from vehicle sensors 28.

User Device

The user device 20 may be any one of a variety of computing devices implemented via circuits, chips, antenna, or other electronic components, and is typically a portable or wearable user device, e.g., a smartphone, a tablet, a personal digital assistant, etc. The user device 20 incudes a user interface that presents information to and receives information from a user of the user device 20. The user interface may include a touch-sensitive display screen, speaker, microphone, etc. The user device 20 may communicate with other vehicles and computing devices, as described above for the vehicle transceiver 34.

The user device 20 may be programmed to transmit a jump start request, as described above, e.g., in response to a user input to the user device 20 user interface.

The Server Computer

The server computer 14 is a computing device that includes hardware, e.g. circuits, chips, antenna, etc., programmed to transmit, receive, and process information, to and from other computing devices such as those in the vehicle 12, the aerial drones 16, the user device 20, etc., e.g., via the network 18. The server computer 14 may be one or more computers, each generally including at least one processor and at least one memory, implemented as described herein, the memory storing instructions executable by the processor, including instructions for carrying out various steps and processes described herein. The server computer 14 may include or be communicatively coupled to a data store for storing collected data, databases, and other information.

The server computer 14 is programmed to actuate a plurality of drones 16 to first establish one or more electrical connections therebetween and then to provide a jump start to the vehicle 12. To actuate the plurality of drones 16 the server computer 14 may transmit a jump start command to the plurality drones 16, e.g., via the network 18. As used herein, "jump start command" means a communication, e.g., from the server computer 14, instructing that the drones 16 proceed to the specified location to provide electricity to the vehicle 12 at the specified location. The server computer 14 may transmit the jump start command in response to receiving a jump start request, e.g., from the vehicle 12 and/or user device 20 via the network 18.

The jump start command may include the location of the vehicle 12, charge point 26 specifications, a master or slave assignment for the drone 16, jump start parameters, vehicle 12 location, orientation, and identification information, and information regarding other drones 16 intended to receive the jump start command, e.g., master/slave assignments, drone identification information, information from the drone parameter database, etc. The jump start command may be based on the jump start request received from the vehicle 12 and/or the user device 20. The jump start command may be transmitted to a specific drone 16, e.g., by including drone identification information, e.g., a serial number, unique name, etc., associated with the specific drone 16.

The jump start command may instruct specific drones 16 to provide the jump start. For example, the server computer 14 may use a drone parameter database stored on the server computer 14. The drone parameter database may include electrical parameters, e.g., the voltage and/or an amperage that may be provided via electrically conductive end effectors 44, location, identification information, etc., associated with various specific drones 16. The server computer 14 may identify which drones 16 to instruct based on the jump start request and the drone parameter database, e.g., based on a distance from the various drones 16 to the location of the vehicle 12, an ability of for the drone 16 and/or combination of drones 16 to meet the jump start parameters of the vehicle 12, e.g., the ability of the drones 16 to connect in series and/or in parallel to provide the required voltage and/or amperage.

The server computer 14 may be programmed to assign a master drone 16, i.e., a drone 16 instructed to transmit commands to other drones 16, and a slave drone 16, i.e., a drone 16 instructed to obey commands from other drones 16, from among the plurality of drones 16. For example, the server computer 14 may transmit a command instructing a specific drone 16 to be the master or slave, e.g., by transmitting such command including drone identification information for the specific drone 16. As another example, the assignment may be included in the jump start command. The server computer 14 may determine whether to assign drones 16 as master or slave based on the jump start request and information in the drone database, e.g., the closest drone 16 to the location in the jump start request may be assigned as the master.

The Drone

Figure 2:
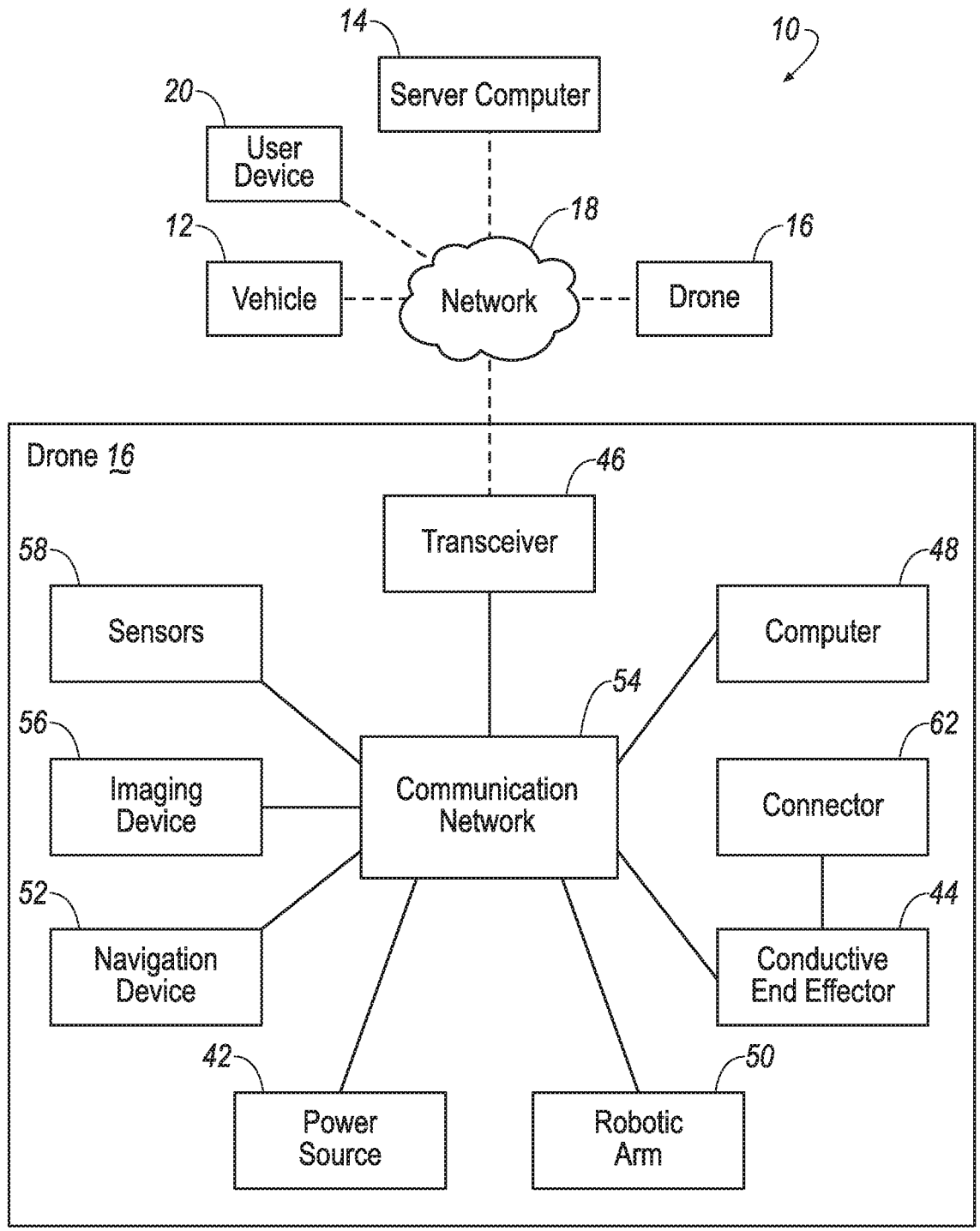
FIG. 2 is a block diagram of components of an example drone and the jump start system of FIG. 1.
Figure 3:
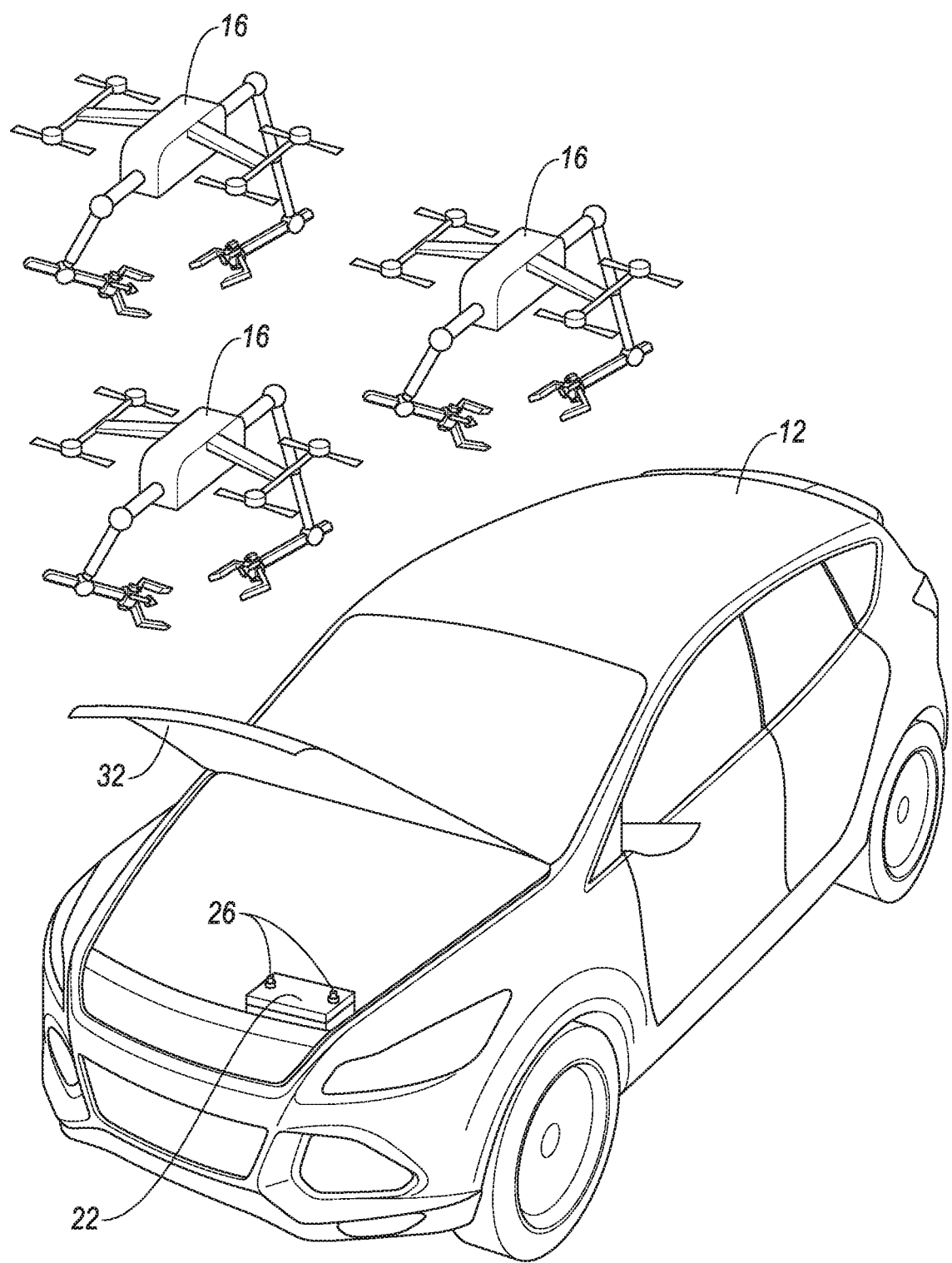
FIG. 3 is a perspective view of the vehicle of FIG. 1 and multiple drones of FIG. 2.
Figure 4:
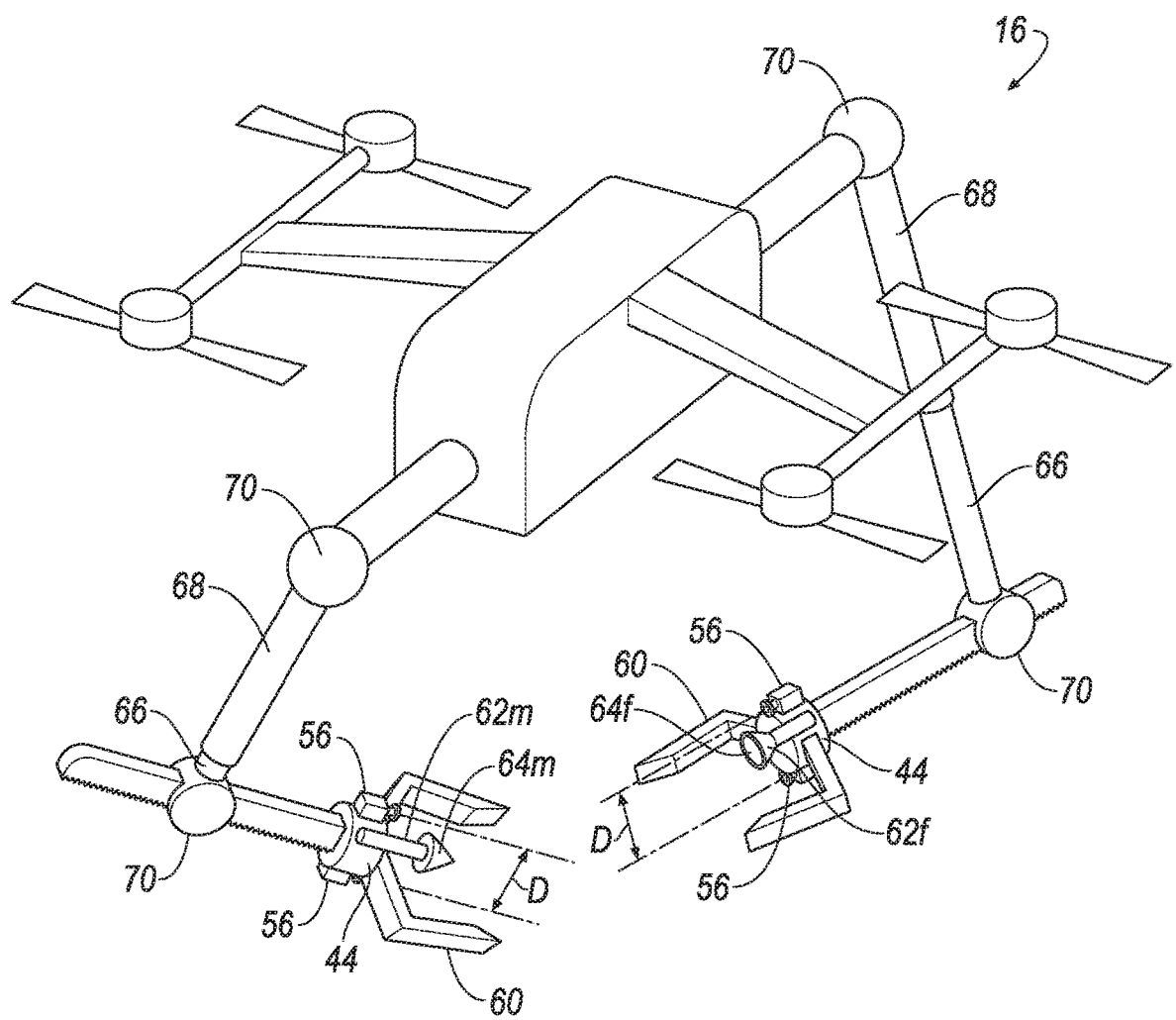
FIG. 4 is a perspective view of the drone of FIG. 2.
Figure 5:
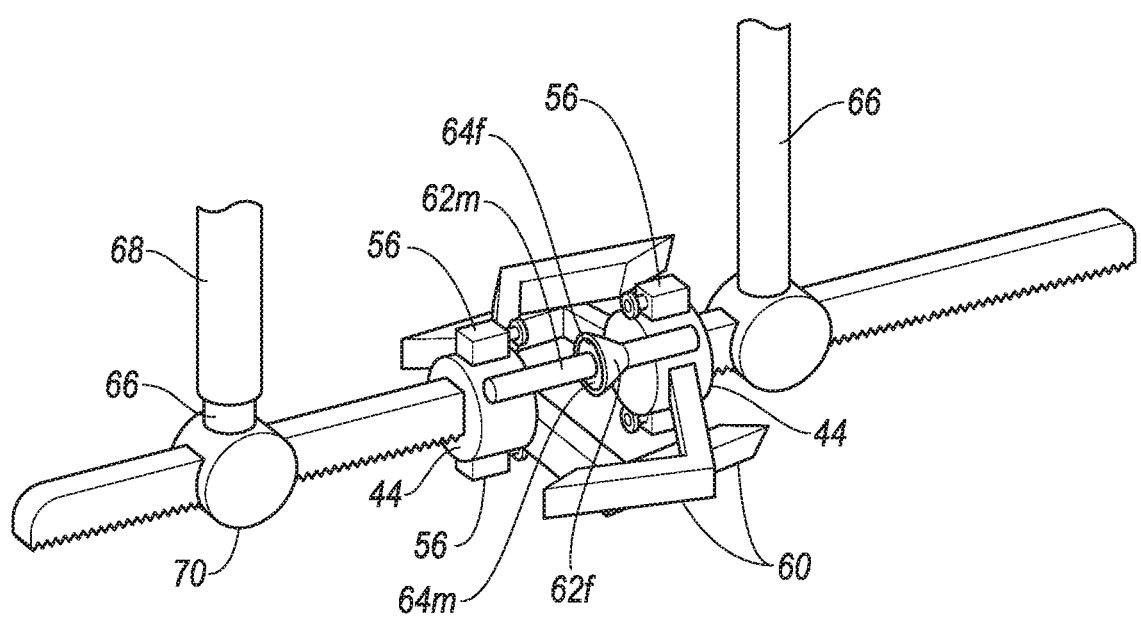
FIG. 5 is a perspective view of electrically connected end effectors of the multiple drones of FIG. 2.

Referring to FIG. 2, the aerial drone 16 is an unmanned aerial vehicle and includes a computing device, such as a drone computer 48, that may include a number of circuits, chips, or other electronic components that can control various operations of the aerial drone 16. For instance, the aerial drone 16 may fly in accordance with control signals output to its propeller motors. Components of the aerial drone 16 may include first and second electrically conductive end effectors 44, a plurality of robotic arms 50, a drone power source 42, a drone navigation device 52, a drone communication network 54, a drone transceiver 46, the imaging device 56, and one or more drone sensors 58. The components of the aerial drone 16 may be mounted on, or within, a main body of the aerial drone 16. The main body may include an internal or external support frame, a housing, etc.

The first and second electrically conductive end effectors 44 can provide a load voltage to the vehicle 12 to allow the vehicle 12 battery to store electricity, e.g., to start an internal combustion engine of the vehicle 12, e.g., to use the drone 16 as a power source for what is known as a "jump start." The end effectors 44 may include circuits, chips, computing devices, or other electronic components that can control various operations of the end effectors 44, such as in response to a command from the computer 48. For example, the first and second electrically conductive end effectors 44 may be in electrical communication with, i.e., electrically connected to, the drone power source 42 and/or the drone computer 48, e.g., electricity may flow from the drone power source 42 to the end effectors 44 upon actuation by the drone computer 48.

The first and second electrically conductive end effectors 44 may include claws 60. In this example, the end effectors 44 may be referred to as "grippers," and the claws 60 may actuate between an open position and a closed position, such as, to grip jump start charge points 26 of the vehicle 12, e.g., a terminal of a battery, and/or to grip electrically conductive end effectors 44 of another drone 16. Accordingly, the first and second electrically conductive end effectors 44 may include various drive mechanisms, such as known hydraulic and electro-mechanical mechanisms that utilize piston and cylinder arrangements, servos, motors, chain and sprocket drives, belt and pulley drives, rack and pinion drives, linear actuators, etc., to provide movement of the claw 60. The claw 60 may be made, at least in part, of an electrically conductive material. For example, the claw 60 may be made of a solid copper structure, a plastic core with a copper shell, etc. The first claw may be in electrical communication with the drone power source 42 and/or the drone computer 48.

The first and second electrically conductive end effectors 44 may include electrical connectors 62, such as a male connector 62$m$ and/or a female connector 62$f$. The male connector 62$m$ may include an external conical shaped conductive surface 65$m$, and the female connector 62$f$ may include an internal conical shaped conductive surface 64$f$. The connectors 62 are electrically connected to the drone power source 42.

The connectors 62 and/or the claws 60 provide for an electrical connection to be established between drones 16 and/or between the drone 16 and the vehicle 12. As used herein "electrical connection" means a pathway for the flow of electricity from the drone 16 to the vehicle 12 and/or another drone 16. The electrical connection may be provided with a physical contact of components, e.g., one electrical conductive component abutting another. For example, the external surface 64$m$ of the male connector 62$m$ may be urged against the internal surface 64$f$ of the female connector 62$f$, e.g., of another drone 16, and vice versa. As another example, the claws 60 may grip a conductive element of the vehicle 12, e.g., the charge points 26, and/or of another drone 16, e.g., the conductive end effectors 44 of the other drone 16. The electrical connection may be provided without the physical contact of the electrical components, e.g., using electromagnetic inductive devices and techniques.

The electrically conductive end effectors 44 may be supported by the main body of the drone 16, e.g., via the robotic arms 50. For example, one end of the robotic arm 50 may be connected to the main body, and an opposite end of the robotic arm 50 may be connected to one of the electrically conductive end effectors 44, e.g., as an end effector of the robotic arm 50.

The robotic arms 50 may include one or more link members connected by a pivoting or rotating hinge. The robotic arms 50 may include various drive mechanisms, such as known hydraulic and electro-mechanical drive mechanisms that utilize piston and cylinder arrangements, servos, motors, chain and sprocket drives, belt and pulley drives, rack and pinion drives, linear actuators, etc., to provide movement to the robotic arms 50. The robotic arms 50 may include a number of circuits, chips, computing devices, or other electronic components that can control various operations of the robotic arms 50, such as actuation of the various drive mechanisms in response to a command from the drone computer 48.

The robotic arms 50 may telescope or otherwise actuate to vary a length of the robotic arm 50. For example, the robotic arm 50 may include a first link member 66 and a second link member 68 between a pair of hinges 70. The first link member 66 may be slidably received by the second link member 68. Actuation of drive mechanisms, e.g., in response to a command from the drone computer 48 cause the first link member 66 to slide relative to the second link member 68, thereby changing a length of the robotic arm 50. As another example, a link member may be configured to move linearly relative to the hinge 70, e.g., with a rack and pinion or drive mechanism, e.g., in response to a command from the drone computer 48.

The drone power source 42 provides a load voltage to jump start the vehicle 12, e.g., 50 amps at 12 volts. The drone power source 42 may be a battery, such as a lithium-ion polymer battery, a nickel-metal hydride battery, etc. The drone power source 42 may be a capacitor. The drone power source 42 may provide electricity to navigate the aerial drone 16, such as proving power to the propeller motors, to move the robotic arms 50 and operate the various end effectors, such as the electrically conductive end effectors 44, etc.

The drone navigation device 52 determines a location of the drone 16 relative to stored map data. Map data may include roads and related data, such as buildings, towers, no fly zones, etc. To determine the location, the drone navigation device 52 may rely on information from a global navigation satellite system, distance data from drone sensors 58, a gyroscope, and/or an accelerometer. The map data may be stored locally, such as on the drone memory, or on the drone navigation device 52. Additionally or alternatively, the map data may be stored on the server computer 14, accessible via the network 18. Example drone navigation devices 52 include known GPS (global positioning system) navigation devices.

The drone communication network 54 includes hardware, such as an antenna, circuits, chips, etc., for facilitating wired or wireless communication among drone components in accordance with a number of communication protocols such as the Dedicated Short Range Communication (DSRC) communication protocol, controller area network (CAN), Ethernet, WiFi, Local Interconnect Network (LIN), and/or other wired or wireless mechanisms.

The drone transceiver 46 transmits and receives information wirelessly from other transceivers, enabling signals, data and other information to be exchanged with other computer and network systems. The transceiver 46 is implemented via antennas, circuits, chips, or other electronic components that can facilitate wireless communication. Example transceivers include Wi-Fi systems, radio transmitters and receivers, telecommunications systems, Bluetooth® systems, cellular systems and mobile satellite transceivers. The transceiver 46 may communicate with other vehicles and computing devices, e.g., the vehicle 12, other drones 16, and the server computer 14, etc. e.g., as described above concerning the transceiver 34.

The drone imaging device 56 may include one or more of a digital (still and/or video) camera that captures light in the visible spectrum, e.g., LiDAR, an infrared light detector, an ultrasonic sensor, and/or other sensors. As is known, LIDAR is a technique for transmitting scanned light pulses, which can be from a laser, for example, and measuring the time of flight of the pulses to determine 3D range or distance to points in the surrounding real world. Further as is known, a camera can capture two-dimensional digital images comprised of pixels. In general, the imaging device 56 captures conventional images in the visible light spectrum, and/or captures images outside of the visual spectrum, for example an infrared image showing detected temperatures.

One or more drone imaging device 56, e.g., cameras, may be supported by the robotic arm 50. For example, a pair of cameras 56 may be positioned relative to each other, e.g., aligned parallel to each other a spaced a determined distance D apart (see FIG. 4), to capture images of objects that may analyzed with stereoscopic techniques to identify a three-dimensional position of such objects relative to each other and relative to the pair of cameras 56.

The drone sensors 58 collect and send data to the drone computer 48. The drone sensors 58 may detect internal states of the drone 16, for example the speed of the propeller motors, the charge level and/or voltage of the drone power source 42, the pressure applied with the electrically conductive end effectors 44, the voltage across the first and second electrically conductive end effectors 44, etc. The drone sensors 58 may detect the position or orientation of the aerial drone 16, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The drone sensors 58 may detect the external world, for example, light measurement sensors, photometers, wind speed measurement sensors, radar sensors, scanning laser range finders, light detection and ranging (LIDAR) devices, and image processing sensors such as cameras.

The drone computer 48 is a computing device that includes a processor and a memory.

The drone processor is implemented via circuits, chips, or other electronic components and may include one or more microcontrollers, one or more field programmable gate arrays (FPGAs), one or more application specific circuits (ASICs), one or more digital signal processors (DSPs), one or more customer integrated circuits, etc. The drone processor is programmed to process the data and communications received via the drone sensors 58, the imaging device 56, the transceiver 46, the drone navigation device 52, the drone memory, etc. Processing the data and communications may include processing to perform the programming and processes described herein, such as those described in processes 600 and 700.

The drone memory is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The drone memory may store instructions for performing the processes described herein, such as those described in the processes 600 and 700, and data collected from sensors and communications.

The drone computer 48 may be programmed to transmit and/or receive commands, e.g., from other drones 16, the server computer 14, and/or the vehicle 12, e.g., via drone transceiver 46.

The drone computer 48 may be programmed to navigate the drone 16 to the location of the vehicle 12. For example, the drone computer 48 provides the location of the vehicle 12, e.g., from the jump start command, to the drone navigation device 52. The drone computer 48 may then actuate the propeller motors to navigate the aerial drone 16 to the location of the vehicle 12 based at least on information received from the drone navigation device 52.

The drone computer 48 may be programmed to transmit and/or receive an instruction specifying a connection order, e.g., from the master drone 16 to the slave drone 16. As used herein, "connection order" means the physical connection order of the drones 16 with the vehicle 12 to establish an electrical communication therebetween to provide the jump-start. The connection order may include an instruction to connect the drones 16 in series, in parallel, or some combination thereof. The connection order may include electrical connection points, e.g., of the vehicle 12 and/or other drones 16, for connection, e.g., with a specific electrically conductive end effector 44 of the receiving drone 16. The connection order may include a hovering and/or landing location for the receiving drone 16 to occupy, e.g., based on the jump start parameters.

The drone computer 48 is programmed to establish an electrical connection between the drones 16, and then provide a jump start to the vehicle 12, e.g., in response to receiving the jump start command.

To establish the connection, the drone computer 48 may be programmed to actuate the robotic arm 50 supported by the drone 16 to connect with another the plurality of drones 16. The drone computer 48 may actuate the robotic arm 50 based on information received from sensors 58, the drone imaging device 56, and/or the other drone 16. For example, the sensors 58 may detect various components, e.g., the electrically conductive end effectors 44, of the other drone 16, e.g., using various data processing techniques, such as known techniques for processing LIDAR data. As another example, the drone computer 48 may determine a location in three-dimensional space of a component of another drone 16, e.g., a connector 62 or end effector 44, relative to the pair of cameras 56c, based on image data, e.g., a pair of images, e.g., repeatedly captured and analyzed, such as every 50 milliseconds, and/or streaming data captured by the pair of cameras 56c. The image data may be analyzed, e.g., with known stereoscopic analysis and image recognition techniques, methods, and algorithms, by the computer 48 to make such determination.

The server computer 14 may actuate the robotic arm 50 to connect with the other drone 16 based the location in three-dimensional space, e.g., by sending actuation commands to the robotic arm 50 via the drone communication network 54. For example, to establish the electrical connection, the server computer 14 may send a command to the conductive end effector 44 to actuate movement of the claws 60 toward the closed position to grip the electrically conductive end effector 44 of another drone 16. As an alternative example, the drone computer 48 may actuate the robotic arm 50 to position of the male or female connector 62 supported by the robotic arm 50 to connect with a mating connector 62 supported by another drone 16 (see FIG. 5).

The drone computer 48 may be programmed to apply a load voltage to the vehicle 12 via the first and second electrically conductive end effectors 44 that are supported by the aerial drone 16. For example, the drone computer 48 may control the flow of electric power between the drone power source 42 and the conductive end effectors 44.

Process

Figure 6:
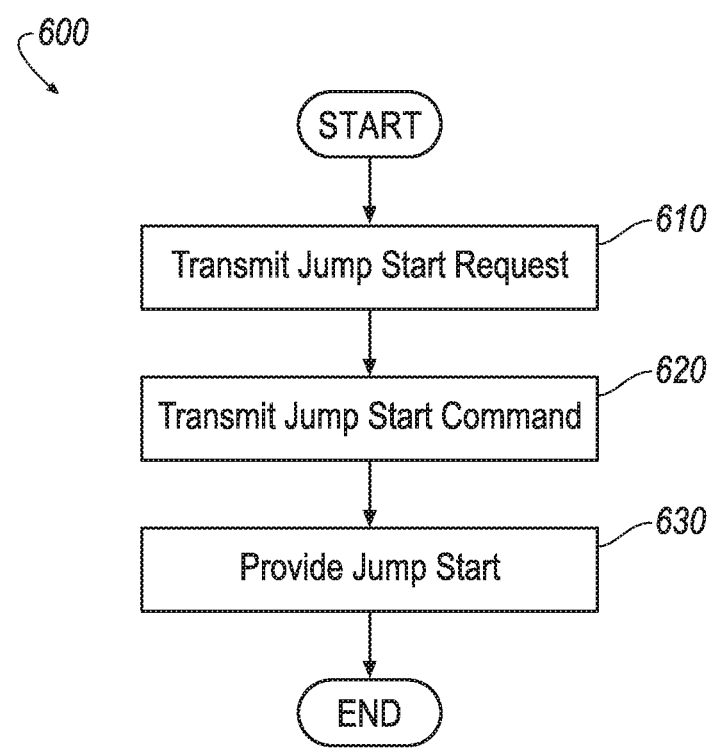
FIG. 6 is a flow chart of an example process of controlling a jump start delivery system.

FIG. 6 is a process flow diagram illustrating an exemplary process 600 for providing a jump start to the vehicle 12 with a plurality of drones 16. The process 600 begins in a block 610 in response to a user input, e.g., to the vehicle 12 user interface 36 and/or the user interface of the user device 20, and/or in response to a determination by the computer 40 that the engine of the vehicle 12 is not running and a voltage of the battery 22 is below a threshold, e.g., 8 volts, etc. Process 600 blocks may be executed by a processor of, according to programming stored in a memory of, the one or more drone computer 48, the server computer 14, and/or the vehicle computer 40.

At the block 610 a jump start request is transmitted, e.g., from the vehicle 12, e.g., from the transceiver 34. The request may be transmitted to the server computer 14 via the network 18 in response to an instruction from the vehicle computer 40 via the communication network 38, and/or from user device 20.

Next, at a block 620, the server computer 14 transmits one or more jump start commands to a plurality of drones 16, e.g., via the network 18. The one or more jump start commands are based on the jump start request. The server computer 14 may identify specific drones 16 to which to transmit the jump start command(s). For example, a drone 16 could be selected to receive a jump start command based on information in the jump start request, such as the jump start parameters and the vehicle 12 location. Further for example, information in the drone parameter database could be compared to the vehicle 12 location to identify one or more drones 16 that are a shortest travel distance from the vehicle 12, e.g., a flight distance taking into account no fly zones, and that are able to connect in series and/or in parallel to provide sufficient voltage and/or amperage to jump start the vehicle 12.

Next, at a block 630, the plurality of drones 16 provide a jump service to the vehicle 12 in response to receiving the jump start command. For example, the drones 16 may navigate to the location of the vehicle 12 as specified in the jump start command.

Upon arrival at the location, the drones 16 may establish communications with the other drones 16 and/or the vehicle 12, e.g., the drone computer 16 may instruct the transceiver 46 to establish such communications. To enable such communicative connection, the drone computer 16 may address communications to the vehicle 12 and/or to other drone(s) 16, e.g., based on the vehicle and the drone identification information included in the jump start command. The drones 16 and the vehicle 12 can communicate with each other to perform the jump start on the vehicle 12, as further described below. For example, messages from one or more drones 16 can result in the vehicle computer 40 providing commands to one or more vehicle components, e.g., to open the hood 32 of the vehicle 12. As another example messages from the vehicle 12 and/or one or more other drones 16 can cause the drone computer 48 to provide commands to one or more drone components, e.g., to establish an electrical connection with the other drone(s) 16, to provide a load voltage to the vehicle 12, to terminate to the electrical connection, etc.

While the drones 16 perform the jump start they may land on or hover proximate to the vehicle 12, e.g., based on the hovering or landing location included in the jump start parameters in the jump start command, in the connection order message, and/or communicated from the vehicle 12, as discussed above.

After performing the jump start the drones 16 return to their respective home locations. More details concerning how the drones 16 may respond to a jump start request are provided below with respect to the process 700 of FIG. 7. After the block 630, the process 600 ends.

Figure 7:
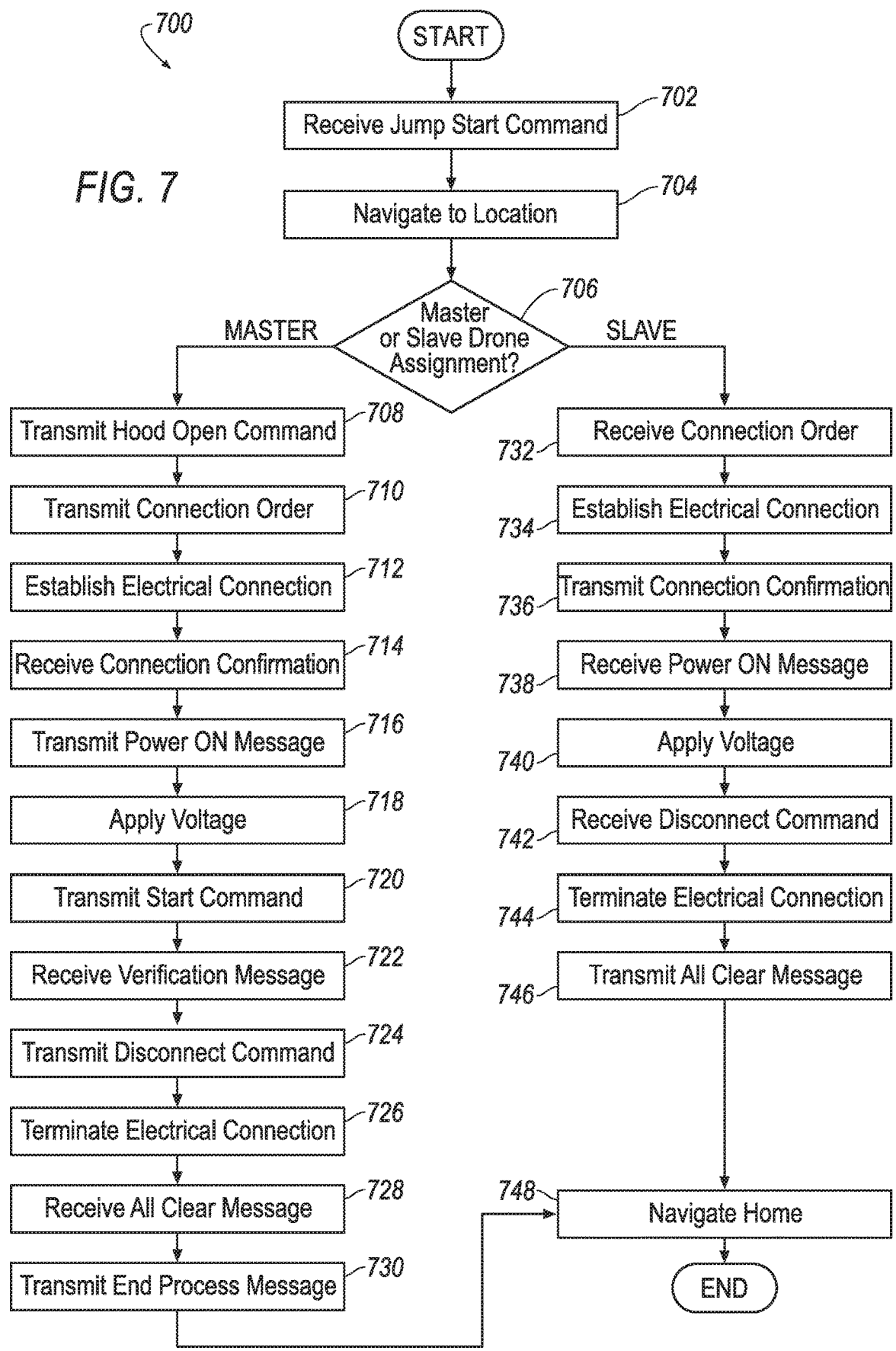
FIG. 7 is a flow chart of an example process of controlling an aerial drone to provide a jump start.

FIG. 7 is a process flow diagram illustrating an exemplary process 700 for a drone 16 to provide a jump start to the vehicle 12. Process 700 blocks may be executed by a processor of, according to programming stored in a memory of, the one or more drone computers 48. The process 700 begins in a block 702 when the drone 16 receives the jump start command.

Next, at a block 704, the drone 16 navigates to the location of the vehicle 12 requesting the jump start. For example, the drone computer 48 typically provides the location of the vehicle 12, e.g., from the jump start command, to the drone navigation device 52. The drone computer 16 may then actuate the propeller motors and other drone 16 components to navigate the aerial drone 16 to the location of the vehicle 12 based at least on information received from the drone navigation device 52.

Next, at a block 706, the drone 16 determines whether it is a master or a slave. The drone 16 may determine whether it is the master or slave based on a set of rules, such as assigning as the master the first drone 16 to arrive at the vehicle 12, as one example. The server computer 14 and/or vehicle computer 40 may determine the master or slave assignment, e.g., based on the set of rules, and transmit an instruction to the drone 16. For example, the drone computer 48 makes such determination based on the assignment of master or slave included in the jump start command. When the drone computer 48 determines the drone 16 is the master drone 16 the process 700 moves to a block 708. When the drone computer 48 determines the drone 16 is a slave drone 16 the process moves to a block 732.

At the block 708 the drone 16 transmits a hood open command. The hood open command may be addressed to the vehicle 12, e.g., by the including vehicle identification information from the jump start command.

Next, at a block 710, the drone 16 transmits a connection order message including the connection order to one or more of the other drones 16 providing the jump start, e.g., drones 16 assigned as slaves. The master drone 16 may assign various hovering or landing locations identified in the jump start command to slave drones 16 with the connection order message.

Next, at a block 712, the drone 16 establishes an electrical connection with one or more other drones 16 and/or the vehicle 12. While establishing the electrical connection the drone 16 occupy the landing or hovering location included in the jump start parameters, e.g., as included in the jump start command or the connection order message.

To establish the electrical connection with another drone 16, the drone computer 48 may provide commands, e.g., via the communication network 54, to actuate one or more robotic arms 50 of the drone 16. The commands may be based in part on information received by the drone computer 48 from the transceiver 46, the imaging device 56, the sensors 58, etc. For example, image data from the pair of cameras 56c may be analyzed, e.g. with known stereoscopic and image recognition techniques, to identify a three-dimensional position of a conductive end effector 44 and/or a connector 62 of another drone 16 relative to the cameras 56c.

To establish the electrical connection with the vehicle 12, the drone computer 48 may locate the charge points 26 using the drone imaging device 56, such as analyzing the image from the imaging device 56 using known image processing techniques and comparing it to the image in the charge point specification, e.g., as included in the jump start command.

The drone computer 48 may actuate the robotic arm 50 to position the end effector 44 and/or connector 62 relative to the identified position of the charge point 26, the conductive end effector 44 and/or the connector 62 of the other drone 16, e.g., to connect connectors 62, to grip the end effector 44 of another drone 16 or the charge point 26 of the vehicle 12, etc.

Next, at a block 714 the drone 16 receives one or more connection confirmation messages from one or more other drones 16 assigned as slaves, e.g., as described in a block 736 below. The connection confirmation message indicates that the transmitting drone 16 has established an electrical connection with other drones 16 and/or the vehicle 12, e.g., to provide the jump start and as instructed with the connection order message. The connection confirmation message may include drone identification information for the transmitting drone 16 and for the receiving drone 16.

Next, at a block 716, the drone 16 transmits a power on message. The power on message is an instruction to one or more other drone 16, such as the slave drone(s) 16, instructing the receiving drone(s) 16 to apply a voltage to its conductive end effectors 44, e.g., as described herein. The power on message may be sent upon receipt of respective connection confirmation messages from each of the drones 16 participating in the jump start.

Next, at a block 718, the drone 16 applies a voltage to its conductive end effectors 44. For example, the drone computer 48 may control the flow of electric power between the drone power source 42 and the conductive end effectors 44, the drone computer 48 permitting electric power to flow between the drone power source 42 and the conductive end effectors 44 while the conductive end effectors 44 are gripping the charge points 26 and/or are connected to another drone 16.

Next, at a block 720, the drone 16 transmits a start command to the vehicle 12. The drone computer 48 may send the start command to the vehicle 12 while the load voltage is being applied, e.g., as described with respect to the block 718.

Next, at a block 722, the drone computer receives an engine start verification message from the vehicle 12. The engine start verification message indicates that the engine of the vehicle has started, e.g., as determined by the vehicle computer 40 based on information from the sensors 28.

Next, at a block 724, the drone 16 transmits a disconnect command to the other drone(s) 16, e.g., to the slave drone(s) 16. The disconnect command is an instruction to the other drone(s) 16 to terminate their connection with other drones 16 and/or the vehicle 12. The drone 16 may transmit the disconnect command upon receipt of the engine start verification message.

Next, at a block 726, the drone 16 terminates the electrical connection with one or more other drones 16 and/or the vehicle 12. To terminate the connection, the drone computer 48 may instruct actuation the robotic arm(s) 50, e.g., to release the grip on the conductive end effector 44 of the other drone(s) 16 and/or the charge point 26 of the vehicle 12, to move the connector 62 away from, i.e., to disconnect from, the connector 62 of the other drone 16, etc.

Next, at a block 728, the drone 16 receives an all clear message, e.g., from one or more other drones 16 assigned as slaves. The all clear message indicates that the transmitting drone 16 has terminated electrical connection with the other drones 16 and/or the vehicle 12 and is clear of the vehicle 12, e.g., the transmitting drone 16 is not in a location that would interfere with closing the hood 32 of the vehicle 12, such as the area between the hood 32 and the engine bay of the vehicle 12. The all clear message may include drone identification information for the transmitting drone 16 and for the receiving drone 16.

Next, at a block 730, the drone 16 transmits an end process message to the vehicle 12. The end process message indicates that the jump start has completed and that drones 16 participating in the jump start are in a position such that the vehicle 12 may actuate the hood 32 to the closed position. The end process message may be send upon receipt of the all clear message from all drones 16 participating in the jump start. Following the block 740, the process 700 proceeds to a block 748, discussed below.

At the block 732, which may follow the block 706, the slave drone 16 receives the connection order message, e.g., from a master drone 16.

Next, at a block 734, the drone 16 establishes an electrical connection with one or more other drone(s) 16 and/or the vehicle 12. For example, as described above at the block 712.

Next, at the block 736, the drone 16 transmits the connection confirmation message, e.g., to another drone 16 assigned as the master and received as described above for the block 714. The connection confirmation message may be sent upon establishing the electrical connection with one or more other drones 16 and/or the vehicle 12, e.g., upon completion of the block 734.

Next, at a block 738, the drone receives the power on message, e.g., from a master drone 16.

Next, at a block 740, the drone 16 applies a voltage to its conductive end effectors 44, e.g., as described above at the block 718. The voltage may be applied in response to receiving the power on message.

Next, at a block 742, the drone 16 receives the disconnect command, e.g., from a master drone 16, e.g., as described above at the block 724.

Next, at a block 744, the drone 16 terminates the electrical connection with one or more other drones 16 and/or the vehicle 12, e.g., as described above at the block 726.

Next, at a block 746, the drone transmits the all clear message, e.g., to a master drone 16.

At the block 748 the drone 16 navigates home. For example, the drone computer 16 may actuate the propeller motors to navigate the aerial drone 16 to the home location of the drone 16 based at least on information received from the drone navigation device 52. The home location may be stored locally, e.g., in the drone computer 48 and/or the navigation device, and/or remotely, e.g., on the server computer 14.

Conclusion

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored in computer readable media associated therewith (e.g., disks, memories, etc.). A computer program product may comprise such instructions stored in computer readable media for carrying out the functions described herein.

The adjectives "first" and "second" are used throughout this document as identifiers and are not intended to signify importance or order.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising, a computer for a first drone, the computer including a processor and a memory, the memory storing instructions executable by the processor such that the computer is programmed to:
actuate a robotic arm supported by the first drone to establish an electrical connection between the first drone and a second drone, and then provide a jump start to a vehicle.

2. The system of claim 1, the computer further programmed to transmit an instruction specifying a connection order to the second drone.

3. The system of claim 2, wherein the connection order is one of in series and in parallel.

4. The system of claim 1, wherein the computer is further programmed to determine a location in three-dimensional space of an electrically conductive end effector supported by the second drone based on a pair of images captured by a pair of cameras supported by the robotic arm of the first drone, wherein actuating the robotic arm to establish the electrical connection between the first drone and the second drone is based on the location in three-dimensional space.

5. The system of claim 1, wherein the robotic arm is a telescoping robotic arm supporting an electrically conductive end effector electrically connected to a first drone power source.

6. The system of claim 1, wherein the robotic arm supports a camera and an electrically conductive end effector electrically connected to a first drone power source.

7. The system of claim 1, wherein the robotic arm is a robotic arm supporting an end effector comprising one of a male and female electrical connector that is conical.

8. The system of claim 1, further comprising a server computer programmed to communicate with the first drone computer to actuate the first drone to establish the electrical connection.

9. The system of claim 1, the first drone computer further programmed to transmit an instruction specifying a connection order to the second drone.

10. A method comprising:
actuating a plurality of drones to first establish one or more electrical connections therebetween and then to provide a jump start to a vehicle, including actuating a robotic arm supported by a first drone of the plurality of drones to connect the first drone with a second drone of the plurality of drones.

11. The method of claim 10, further comprising assigning a master drone and a slave drone from among the plurality of drones.

12. The method of claim 11, further comprising transmitting an instruction specifying an order of connection of the drones from the master drone to the slave drone.

13. The method of claim 10, further comprising receiving a jump start request including jump start parameters before actuating the plurality of drones.

14. The method of claim 13, wherein the jump start parameters include one of a voltage and an amperage.

15. The method of claim 10, further comprising determining a location in three-dimensional space one of an electrically conductive end effectors supported by the second drone based on a pair of images captured by a pair of cameras supported by the robotic arm of the first drone, wherein the robotic arm of the first drone is actuated to connect to the second drone based on the location in three-dimensional space.

16. A system, comprising:
a plurality of drones, each including respective robotics arms; and
a first drone computer included in a first drone of the plurality of drones, the first drone computer including a processor and a memory, the memory storing instructions executable by the processor such that the computer is programmed to actuate a robotic arm supported by the first drone to establish an electrical connection between a first drone and a second drone included in the plurality of drones, and then provide a jump start to a vehicle.

17. The system of claim 16, wherein the first drone computer is further programmed to determine a location in three-dimensional space of an electrically conductive end effector supported by the second drone based on a pair of images captured by a pair of cameras supported by the robotic arm of the first drone, wherein actuating the robotic arm to establish the electrical connection between the first drone and the second drone is based on the location in three-dimensional space.

18. The system of claim 16, wherein the robotic arm is a telescoping robotic arm supporting an electrically conductive end effector electrically connected to a first drone power source.

19. The system of claim 16, wherein the robotic arm supports a camera and an electrically conductive end effector electrically connected to a first drone power source.

20. The system of claim 16, further comprising a server computer programmed to communicate with the first drone computer to actuate the first drone to establish the electrical connection.

* * * * *